(12) United States Patent
Daily

(10) Patent No.: US 11,389,001 B1
(45) Date of Patent: Jul. 19, 2022

(54) BACK SAVER

(71) Applicant: Michael David Daily, Los Angeles, CA (US)

(72) Inventor: Michael David Daily, Los Angeles, CA (US)

( * ) Notice: Subject to any disclaimer, the term of this patent is extended or adjusted under 35 U.S.C. 154(b) by 0 days.

(21) Appl. No.: 17/193,876

(22) Filed: Mar. 5, 2021

(51) Int. Cl.
*A47C 3/18* (2006.01)
*A47C 3/20* (2006.01)
*G05B 19/042* (2006.01)

(52) U.S. Cl.
CPC .............. *A47C 3/20* (2013.01); *A47C 3/18* (2013.01); *G05B 19/0426* (2013.01); *G05B 2219/25268* (2013.01)

(58) Field of Classification Search
CPC ................................. A47C 3/18; A47C 3/20
USPC ..................................................... 297/344.23
See application file for complete search history.

(56) References Cited

U.S. PATENT DOCUMENTS

| | | | | |
|---|---|---|---|---|
| 4,034,947 A * | 7/1977 | Geisel | A47C 3/18 297/219.1 X |
| 4,659,050 A * | 4/1987 | Tabayashi | A47B 49/00 248/349.1 |
| 5,318,339 A * | 6/1994 | Cherniak | B60N 2/245 297/344.26 X |
| 5,381,569 A * | 1/1995 | Church | A61G 7/1076 108/139 |
| 5,441,329 A * | 8/1995 | Janisch | A47C 3/18 297/344.21 X |
| 5,779,309 A * | 7/1998 | Lu | A47C 3/18 297/344.26 X |
| 6,015,188 A * | 1/2000 | Yundt | A47C 3/16 297/344.26 X |
| 6,854,608 B2 * | 2/2005 | McNeeley | A47B 49/00 211/78 |
| 6,896,330 B1 * | 5/2005 | Yu | A47C 3/18 297/344.26 X |
| 6,997,512 B1 * | 2/2006 | Yu | A47C 3/16 297/344.26 X |
| 7,159,940 B1 * | 1/2007 | Atkins | A47C 7/021 297/344.26 X |
| 8,544,390 B1 * | 10/2013 | Bahnsen | A47G 23/08 108/94 |
| 10,449,405 B2 * | 10/2019 | Endelman | A63B 21/00069 |

(Continued)

FOREIGN PATENT DOCUMENTS

KR 20140146969 A * 12/2014 ............... A47C 3/18

*Primary Examiner* — Rodney B White
(74) *Attorney, Agent, or Firm* — Lyman Moultan, Esq.; Moultan Patents, PLLC

(57) ABSTRACT

The Back Saver is uniquely designed to move independently, directly effecting the dynamic equilibrium in the user's lumbar disc, to prolong the user's comfort level by promoting continuous movement of their pelvis and lower spine, and to facilitate the user's center of gravity through constant movement. The device for a sitting user includes a base housing comprising an inside annular ledge, an outer flat base and electronic components configured for turning and lifting a sitting user. The device also includes a metal movement plate configured to be received into the inside annular ledge and turn therein via an assistive motor action on the metal movement plate. The device further includes a motor configured to turn and lift the sitting user in a sequence of turning and lifting actions determined by the sitting user.

20 Claims, 2 Drawing Sheets

(56) References Cited

U.S. PATENT DOCUMENTS

2017/0340496 A1* 11/2017 Hochman ................. A47C 7/02
2017/0367540 A1* 12/2017 Chang .................... A47K 3/122
2019/0387886 A1* 12/2019 Burden ................... A47C 3/18

* cited by examiner

BACK SAVER

BACKGROUND

Prolonged sitting leads to extreme discomfort, lower back pain and restricted blood flow to the spine. For many individuals who remain in a seated position for long periods of time, the development of chronic lower back pain and disc damage becomes increasingly high considering modern chair cushions which strictly function to soften the seat the user is sitting on. There have been no products available as original equipment or as an aftermarket to address these concerns.

Furthermore, many back injuries occur when a person combines the movements of turning with raising up and lowering down to accomplish a task or playing sports. To alleviate discomfort, lower back pain and encourage the flow of blood to the spine.

There exists a need for a device or apparatus which is inexpensive, easy to use and effective that is not being met by any known or disclosed device or system of present.

SUMMARY OF THE INVENTION

The main purpose of the disclosure is to provide users with an independently activated seat cushion that acts as a back pain reliever device able to reduce the effects of cumulative pressure in the lower back region. The device for a sitting user includes a base housing comprising an inside annular ledge, an outer flat base and electronic components configured for turning and lifting a sitting user. The device also includes a metal movement plate configured to be received into the inside annular ledge and turn therein via an assistive motor action on the metal movement plate. The device further includes a motor configured to turn and/or lift the sitting user in a sequence of turning and lifting actions determined by the sitting user.

Figure 1:
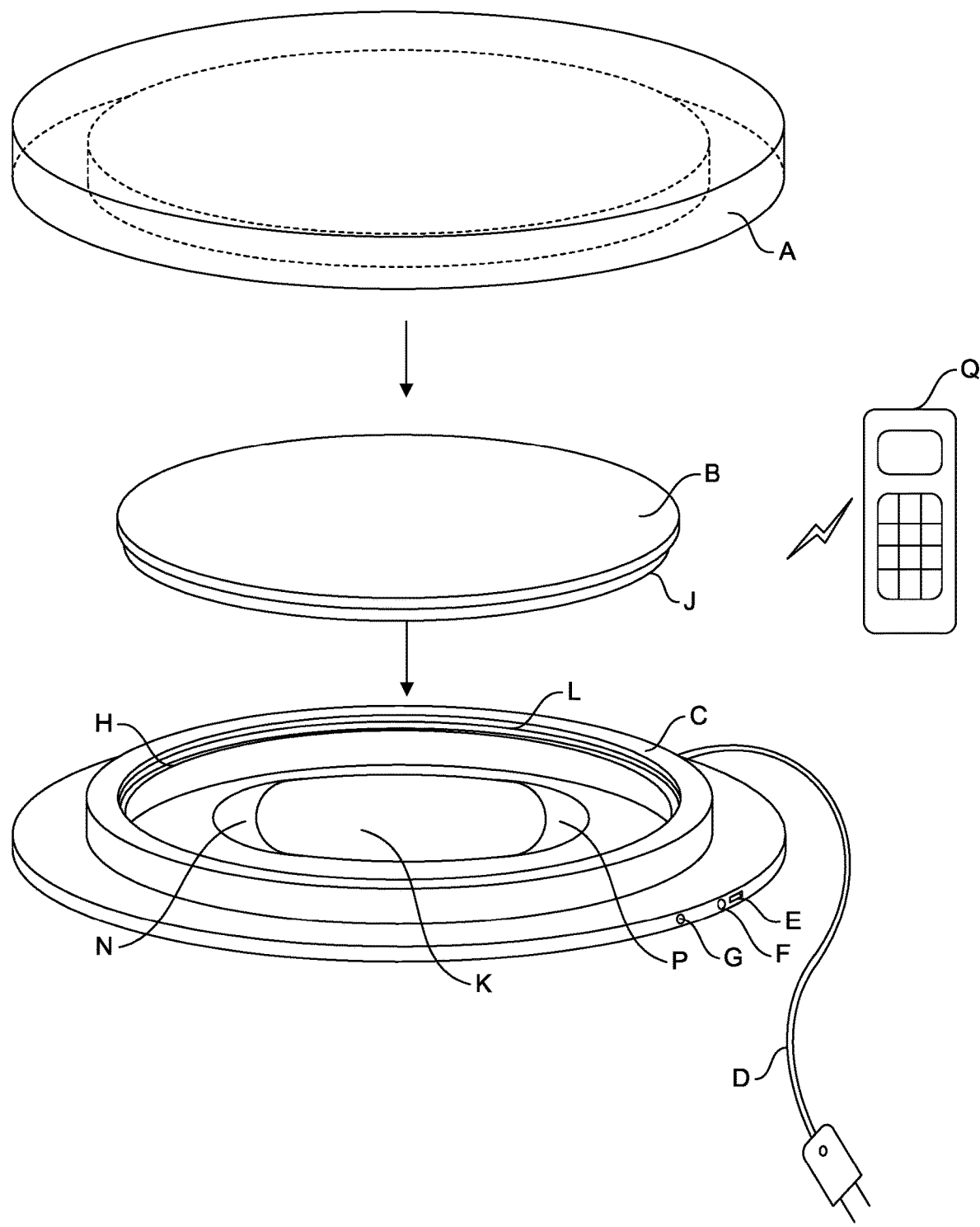
FIG. 1 is a front perspective view of the disclosed Back Saver, separated into three layers, in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a front perspective view of the Back Saver, separated into three layers in accordance with an embodiment of the present disclosure. The view includes: A. the topper, B. the metal movement plate, and C. the base housing. On the Base Housing are 6 additional items shown: D the power cord, E. the USB charging port, D. the power button, G. the mode changing button, and H. the edge for the movement plate to sit on flush in accordance with an embodiment of the present disclosure. The view also includes a helical thread J on an inside perimeter of the metal movement plate B, a pancake motor K for turning and lowering the metal movement plate B disposed in an area defined by the inside annular ledge H, and a complementary helical thread L on an inside of the annular ledge H proximal to the thread J, a synchronization logic and state machine logic and processor N and a wireless transceiver P and a remote control Q for communicating with the device via the wireless transceiver P, The motor K is a stepper motor configured to precisely turn the metal movement plate B on the helical threads J and L on the inside annular ledge H and the metal movement plate B.

Figure 2:
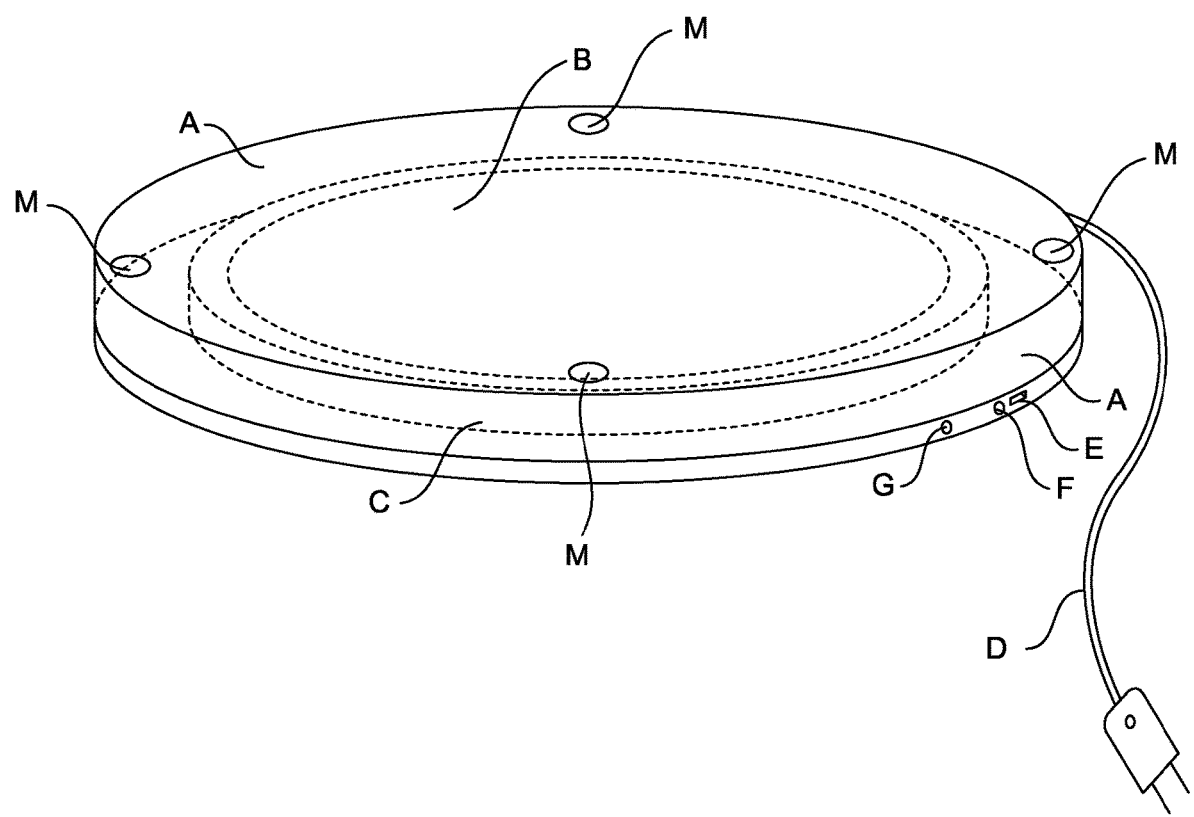
FIG. 2 is a front perspective view of the Back Saver with all three separate pieces put together in accordance with an embodiment of the present disclosure.

FIG. 2. Is a front perspective view of the disclosed Back Saver with all three separate pieces put together in accordance with an embodiment of the present disclosure. The view shows A. the topper, B. the metal movement plate, C. the base housing, D the power cord, E. the USB charging port, D. the power button, G. the mode changing button, and H. the edge for the movement plate to sit on flush in accordance with an embodiment of the present disclosure. The view also includes a plurality of anchors to fix the device to a chair surface including suction cups and hook and loop material and stops or grabbers M which keep the device stationary to a seating surface such as a chair or a couch or a floor etc.

The device for the sitting user further includes a programming interface configured to take predetermined commands from the sitting user to turn and lift the user in a sequence of movements less than a 15 degree turn and an inch height.

A ball bearing interface between the metal movement plate B and the inside annular ledge H facilitates a turning of the metal movement plate B relative to the inside annular ledge H. The stepper motor K is configured to precisely turn the metal movement plate B on the helical threads L and J on the inside annular ledge H and lift the metal movement plate B circularly up and down. The motor is housed in an area defined by the inside annular ledge.

The sequence of turning and lifting actions includes a turn to a first side of a nominal 15 degrees and a lift to a height of ½ inch from an initial position, and a turn and a drop back to the initial position 5 seconds later. The sequence of turning and lifting actions comprises a turn to a first position of a nominal 15 degrees from an initial position and a lift to a height of ½ inch from the initial position and a turn to a second position of a nominal 30 degrees from the first position.

The sequence of turning and lifting actions is determined by a factory programmed state machine to lift and turn the sitting user in perpetuity until a power to the device is removed. The sequence of turning and lifting actions is determined by an electronic processor configured to take input from the sitting user and drive the motor and the metal movement plate. A remote control of the motor and the metal movement plate is also included in an embodiment of the disclosure.

The sequence of turning and lifting actions also comprises left and right turns of a nominal 15 degrees and a raising and a lowering of a height of 1 inch and a return to a home initial position, wherein the inside annular ledge comprises a nylon bushing configured to sustain and facilitate an annular movement thereon of a weight up to 300 pounds.

A synchronizing logic is engineered for synchronization of the turning and the lifting actions to a predetermined piece of music. The synchronizing logic is also engineered for the synchronization of the turning and the lifting actions to a predetermined light sequence. Furthermore, the synchronizing logic is engineered for the synchronization of the turning and the lifting actions to a predetermined piece of music and a light sequence simultaneously.

The Back Saver introduces a device that an individual can sit on for prolonged periods of time. Once placed atop of a normal chair seat, this device independently moves in various directions keeping small, constant movements in the lower spine reducing the effects of cumulative pressure in the lower back. The various movements are programmable into state machine logic and into an electronic processor. The sequence of small constant movements in terms or direction, speed and height are programmed by a user in accordance with an embodiment of the present disclosure. Factory programmed settings for movement are also included in an embodiment.

The Back Saver possesses an internal plate, which is motorized to lift up to 300 lbs., in a clockwise or counter clockwise function, in one particular direction or a random combination of lifting directions in order to directly affect the dynamic equilibrium in the user's lumbar disc and prolong the user's comfort level by promoting continuous movement of their pelvis and lower spine. It facilitates the user's center of gravity to constantly be moving using the Gyroscope Effect; yet, movement is mild enough to be ignored allowing the user to work during extending sitting times without interruption or distraction while enough movement occurs in the lower spine to promote better circulation in and out of the inter-vertebral lumbar disc tissue and promotes better disc hydration avoiding the negative effects from gradual unhealthy compression.

The primary seat topper, furthermore, is comprised of a soft, closed cell foam, durable, moisture and dirt resistant pre-sanitized cushion treated with an antimicrobial treatment to inhibit bacterial and fungi growth designed to sit above a metal movement plate housed into a base unit. The Back Saver ensures a fully operation back relieving device at all times and therefore improves blood flow and promotes better hydration to the disc thus reducing the often compressive forces experienced when sitting at a desk, home or vehicle, for a lengthy amount of time.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A device for a sitting user, the device comprising:
   a base housing comprising an inside annular ledge proximal helical threads thereon, an outer flat base and electronic components configured for turning and lifting a sitting user;
   a metal movement plate configured to be received into the inside annular ledge via helical threads complementary to the base housing helical threads and turn circularly and lift up and down on the metal movement plate relative to the base housing; and
   a motor configured to turn and lift the sitting user on the metal movement plate in a sequence of turning and lifting actions of the respective helical threads determined by the sitting user via the electronic components.

2. The device for the sitting user of claim 1, further comprising a topper plate configured to sit on top of the metal movement plate and offer comfort to the sitting user via a cushion material thereof.

3. The device for the sitting user of claim 1, wherein the electronic components further comprise a mode changing button configured to enable the sitting user to program a series of predetermined turning and lifting modes in the device.

4. The device for the sitting user of claim 1, further comprising a plurality of anchors configured to fix a relation of the device to a chair via suction cups, hook and loop materials and fasteners.

5. The device for the sitting user of claim 1, further comprising an inductive charging pad for the device and an associated battery in the device.

6. The device for the sitting user of claim 1, further comprising a corded charging port including a universal serial bus (USB) charging port.

7. The device for the sitting user of claim 1, further comprising a programming interface configured to take predetermined commands from the sitting user to turn and lift the user in a sequence of movements less than a 15 degree turn and an inch height.

8. The device for the sitting user of claim 1, further comprising a ball bearing interface between the metal movement plate and the inside annular ledge configured to facilitate a turning of the metal movement plate relative to the inside annular ledge.

9. The device for the sitting user of claim 1, wherein the motor is a stepper motor configured to turn the metal movement plate relative to the base housing on respective helical threads in the inside annular ledge.

10. The device for the sitting user of claim 1, wherein the motor is housed in an area defined by the inside annular ledge.

11. The device for the sitting user of claim 1, wherein the sequence of turning and lifting actions comprises a turn to a first side of a nominal 15 degrees and a lift to a height of ½ inch from an initial position, and a turn and a drop back to the initial position 5 seconds later.

12. The device for the sitting user of claim 1, wherein the sequence of turning and lifting actions comprises a turn to a first position of a nominal 15 degrees from an initial position and a lift to a height of ½ inch from the initial position and a turn to a second position of a nominal 30 degrees from the first position.

13. The device for the sitting user of claim 1, wherein the sequence of turning and lifting actions is determined by a factory programmed state machine to lift and turn the sitting user in perpetuity until a power to the device is removed.

14. The device for the sitting user of claim 1, wherein the sequence of turning and lifting actions is determined by the electronic components via an electronic processor configured to take input from the sitting user and drive the motor and the metal movement plate.

15. The device for the sitting user of claim 1, wherein the sequence of turning and lifting actions is determined by a remote control of the motor and the metal movement plate.

16. The device for the sitting user of claim 1, wherein the sequence of turning and lifting actions comprises left and right turns of a nominal 15 degrees and a raising and a lowering of a height of 1 inch and a return to a home initial position.

17. The device for the sitting user of claim 1, wherein the inside annular ledge comprises a nylon bushing configured to sustain and facilitate an annular movement thereon of a weight up to 300 pounds.

18. The device for the sitting user of claim 1, further comprising a synchronizing logic for synchronization of the turning and the lifting actions to a predetermined piece of music.

19. The device for the sitting user of claim 1, further comprising a synchronizing logic for the synchronization of the turning and the lifting actions to a predetermined light sequence.

20. The device for the sitting user of claim 1, further comprising a synchronizing logic for the synchronization of the turning and the lifting actions to a predetermined piece of music and a light sequence.

* * * * *